United States Patent [19]

Kita et al.

[11] 3,821,725

[45] June 28, 1974

[54] MAGNETIC DOMAIN CIRCUIT ARRANGEMENT

[75] Inventors: Yuzo Kita; Fumiyuki Inose; Noriyuki Homma, all of Kokubunji; Michio Yasuda, Koganei, all of Japan

[73] Assignee: Hitachi Ltd., Tokyo, Japan

[22] Filed: Sept. 15, 1972

[21] Appl. No.: 289,210

[30] Foreign Application Priority Data

Sept. 19, 1971 Japan .............................. 46-72784

[52] U.S. Cl.. 340/174 TF, 340/174 HA, 307/88 LC

[51] Int. Cl. .............................................. G11c 11/14

[58] Field of Search ............................... 340/174 TF

[56] References Cited

UNITED STATES PATENTS

| | | | |
|---|---|---|---|
| 3,680,067 | 7/1972 | Chow | 340/174 TF |
| 3,713,118 | 1/1973 | Danylchuk | 340/174 TF |

*Primary Examiner*—James W. Moffitt

*Attorney, Agent, or Firm*—Craig & Antonelli

[57] ABSTRACT

A magnetic domain circuit arrangement wherein the first group of magnetic material patterns (the first magnetic domain circuit) and the second groups of magnetic material patterns (the second magnetic domain circuits) are connected by electric conductor, the first pattern group being formed by providing by evaporation a number of thin high-permeability films of, e.g., permalloy and with the shapes of T-bar, Y-bar etc. on a substrate for magnetic bubbles, the second pattern groups being located at mutually spaced positions within the same substrate as that of the first pattern group, and wherein magnetic bubble-detecting means and current supply means are provided at one end of said electric conductor, while magnetic bubble-generating means is disposed at the other end, whereby in case where a bubble is detected at a predetermined position in said first group of magnetic material patterns, a current flowing through said electric conductor is supplied by the detection output thereof, so as to generate bubbles at predetermined positions in said second groups of magnetic material patterns. Since, with such arrangement, a number of magnetic domain circuits existing at long distances from one another can be easily connected, a complicated logical circuit such as a 1 (input)-to-$n$ (inputs) logical sum and logical product circuit can be constructed.

10 Claims, 13 Drawing Figures

MAGNETIC DOMAIN CIRCUIT ARRANGEMENT

BACKGROUND OF THE INVENTION

1. Field of the Invention

The present invention relates to a magnetic domain circuit, and more particularly to a magnetic domain circuit arrangement in which long-distance wirings are conducted among a plurality of magnetic domain circuits so as to simultaneously execute the logical product, logical sum etc. at 1 to *n*.

2. Description of the Prior Art

When a magnetic material having magnetic anisotropy, such as orthoferrite, is applied with a bias field orthogonal to the plane thereof, it is formed with a cylindrical domain (magnetic bubble). In case where a number of I-shaped and T-shaped (or Y-shaped) magnetic material films are arranged on a substrate to construct a magnetic bubble array and where an in-plane rotating field is imparted to the substrate, the magnetic bubble is moved on the array.

In this case, the magnetic bubble moves in conformity with a predetermined pattern formed of the film of a ferromagnetic substance such as permalloy. This is because the polarity of magnetization which is induced on the pattern by the in-plane rotating field is successively changed on the pattern with rotation of the magnetic field, and the magnetic bubble is shifted by being attracted by a positive magnetic charge generated on the pattern (assuming that the bubble has the negative polarity).

The configuration of the patterns formed of the films of the ferromagnetic substance should accordingly be accurately determined in compliance with a desired circuit.

In the arithmetic part and control part of a digital data processing system and in a number of other digital equipments, it is often desired to simultaneously conduct, for example, the logical product and the logical sum at *n* to 1 between *n* inputs $X_1, X_2 \ldots X_n$ and an input Y. As will be inferred from the above description, however, the circuit patterns cannot be laid on each other in the magnetic domain circuit. It is therefore extremely difficult that, as in an electronic circuit arrangement, various portions located in separate places are freely connected by means of leads to thereby execute logical operations. This is a barrier against putting magnetic domain logical circuits to practical use.

SUMMARY OF THE INVENTION

An object of the present invention is to provide a magnetic domain circuit arrangement which facilitates the connection among a plurality of specially distant magnetic domain circuits, and which can simultaneously realize the logical product, logical sum etc. at 1 to *n*, such simultaneous operations having heretofore been impossible with magnetic domain logical circuits.

Another object of the present invention is to provide a magnetic domain circuit arrangement which is very high in the operating speed.

Still another object of the present invention is to provide a magnetic domain circuit arrangement which can very easily construct a complicated logical circuit arrangement.

Yet another object of the present invention is to provide a magnetic domain circuit arrangement in which, as in the general electronic circuit arrangement in the prior art, lapped wiring among signal lines for connecting a plurality of circuits is possible.

Further objects, features and advantages of the present invention will become apparent by reference to the following description and the accompanying drawing showing the preferred embodiments of the invention.

DESCRIPTION OF THE PREFERRED EMBODIMENTS

In order to facilitate understanding of the present invention, examples of the prior art will be described in more detail with reference to the accompanying drawing.

Figure 1:
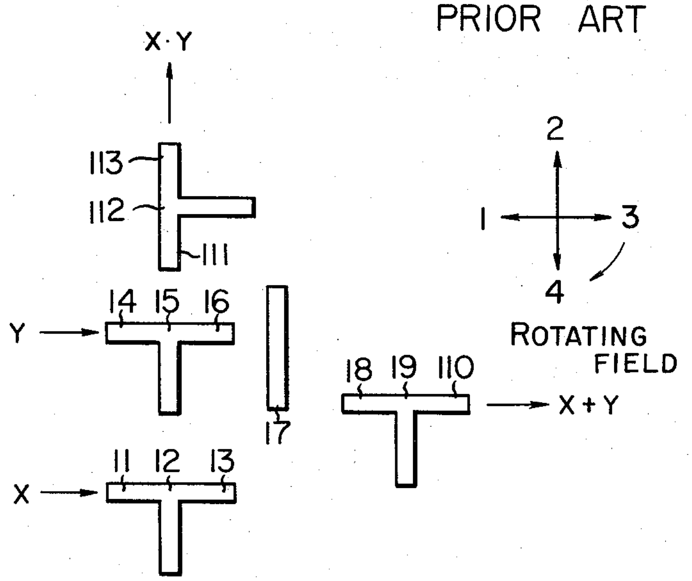
FIG. 1 PRIOR ART
FIG. 1 is a diagram showing an example of a prior-art logical circuit which utilizes magnetic bubbles.
Figure 2A:
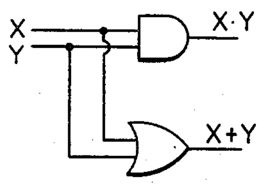
FIGS. 2*a* and 2*b* are diagrams for explaining the function of a logical circuit of the present invention.
Figure 2B:
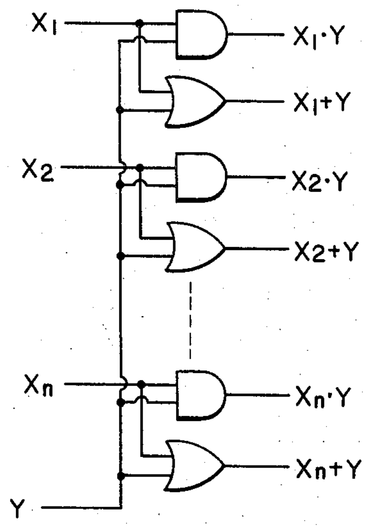
Figure 3:
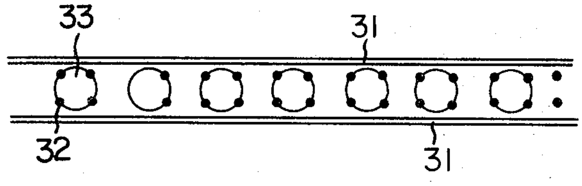
FIG. 3 PRIOR ART
FIG. 3 is an arrangement diagram of a compressor circuit which has hitherto been suggested as an example of a wiring method for magnetic bubbles.

FIG. 1 is a diagram showing a prior-art magnetic domain circuit which operates the logical product and logical sum at 1 to 1 using a magnetic bubble array as previously stated. The plane of the drawing represents a substrate, on which an I-bar magnetic material film and T-bar magnetic material films are arranged as in the figure and thus construct the bubble array. It is now supposed that a rotating field applied to the magnetic bubble array is successively rotated in the directions of 1 → 2 → 3 → 4 as shown. If both an input X and an input Y are "1" (that is, bubbles are present at both the inputs), the bubble corresponding to the state "1" of the input X is located at a position 13 and the bubble of the input Y at a position 16 when the direction of the rotating field is the direction 3. When the rotating field is shifted to the direction 4, the bubble X at the position 13 is moved to a position 17, while the bubble Y at the position 16 is moved to a position 111 due to the force of the rotating field and a repulsive force from the bubble X. If the input X is "0" and no bubble is accordingly present at the position 13, the bubble Y at the position 16 is moved to the position 17 when the rotating field is shifted from the direction 3 to the direction 4. It is understood that this fact that the logical product between the inputs X and Y is obtained from an output position 113, while the logical sum between the same inputs X and Y is derived from an output position 110. FIG. 2*a* is a logical circuit diagram when the logics executed by the circuit shown in FIG. 1 are constructed of conventional logical elements. On the other hand, FIG. 2*b* is a logical circuit diagram when a circuit for simultaneously effecting the logical product operation and logical sum operation at 1 : *n* is constructed of conventional logical elements. It has heretofore been impossible to compose such 1-to-*n* logics of magnetic domain circuits. The most serious cause therefor is that, as will be stated hereinafter, there has not been any appropriate means for the connection between two points in a magnetic domain circuit arrangement which are considerably distant in space. As one of such means, connecting means termed "compressor" as shown in FIG. 3 has been already proposed.

Figure 4:
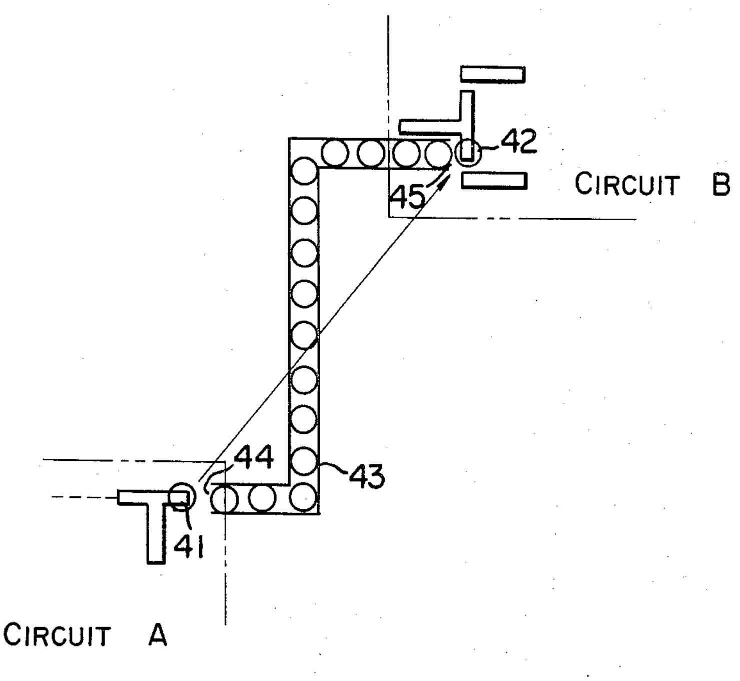
FIG. 4 PRIOR ART
FIG. 4 is a diagram showing the wiring of a magnetic domain circuit arrangement which employs the compressor circuit.

Referring to the figure, numeral 31 designates a line of permalloy, 32 a dot of permalloy, and 33 a bubble. The operation of the circuit will now be explained by reference to FIG. 4. FIG. 4 illustrates an example of arrangement in the case where magnetic bubbles are moved from a circuit A to a circuit B by the use of such compressor. Numeral 43 indicates a path which is filled with the bubbles shown in FIG. 3. When a bubble is injected from a point 41 of the circuit A into one end 44 of the path 43, the bubble at the other end 45 of the path 43 is pushed out therefrom under the repelling action between the respectively successive ones of the bubbles existing within the path 43. Thus, the input bubble is equivalently moved to a predetermined position 42 of the circuit B. The method, however, cannot realize the circuit arrangement, as shown in FIG. 2*b*, which conducts the 1-to-*n* AND operation, OR operation etc. at the same time by such reasons that the bubbles need be always filled in the path 43 and that crossing of the path is impossible.

Figure 5:
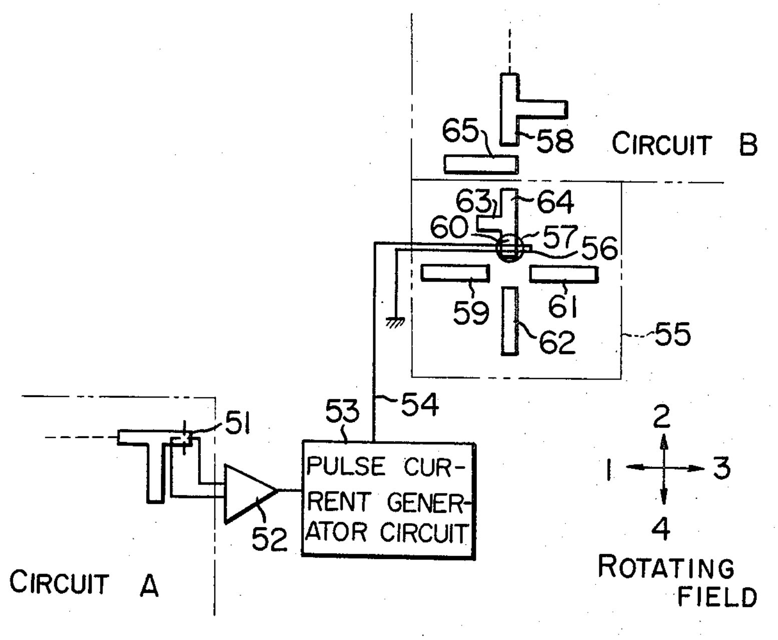
FIG. 5 is a diagram for explaining a wiring method used in a magnetic domain circuit arrangement of the present invention.

FIG. 5 is a diagram for explaining the principle of bubble circuit-connecting means which is utilized in a magnetic domain circuit arrangement of the present invention. Shown in the figure is an example in the case where bubbles are moved from a circuit A to a circuit B. Numeral 51 represents a bubble detector which detects a bubble in the form of an electric signal, and which makes use of, by way of example, the Hall effect. Numeral 52 indicates an amplifier for the detected electric signal, 53 a pulse current generator circuit which is driven by an output from the amplifier 52, 54 a lead through which the pulse current flows, 55 an idler circuit, 56 a hairpin conductor loop, and 57 a magnetic bubble which is always existent in the idler circuit 55.

Figure 6:
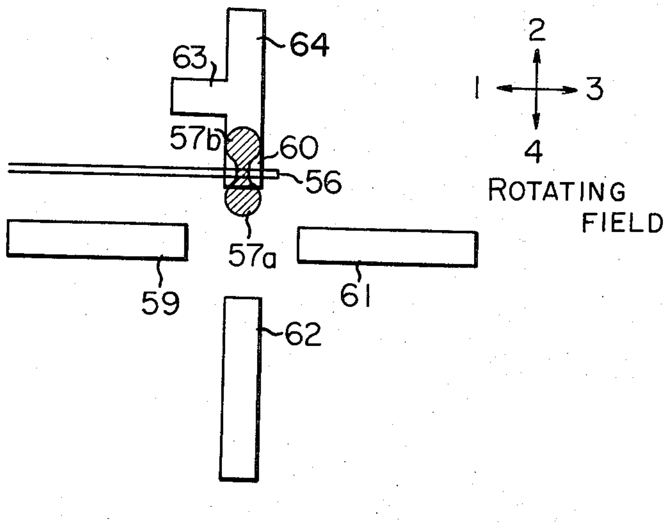
FIG. 6 is a diagram showing an example of an idler circuit used in the circuit arrangement of the present invention.

It is now assumed that, when a bubble arrives at the position of the bubble detector 51 of the circuit A, the applied rotating field is in the direction 3 as shown, and that the bubble in the idler circuit 55 is positioned on a magnetic pole 59 without fail then. When, after detecting the arrival of the bubble by means of the detector 51, the rotating field falls in the direction 4, the pulse current is caused to flow from the circuit 53 to the lead 54. Then, the bubble 57 having been moved from the magnetic pole 59 to the position of a magnetic pole 60 in the idler circuit 55 is divided into two bubbles by the pulse current flowing through the hairpin loop 56. The details are illustrated in FIG. 6. When the rotating field is rotated from the direction 4 to the direction 1, one of the two divided bubbles 57*a* is shifted to a magnetic pole 61, while the other bubble 57*b* is moved to a magnetic pole 63. The bubble 57*a* is thereafter circulated on within the idler circuit 55 (FIG. 5). With the rotation of the rotating field, the bubble 57*b* having moved to the magnetic pole 63 passes through magnetic poles 64 and 65, and reaches a magnetic pole 58 of the circuit B which is the destination. The period of time required for this process is one corresponding to 1 cycle of the rotating fields.

EMBODIMENTS

There will be explained hereunder a few embodiments and applications of the magnetic domain logical circuit according to the present invention to which the foregoing means to connect magnetic domain circuits is applied.

EMBODIMENT I

Figure 7:
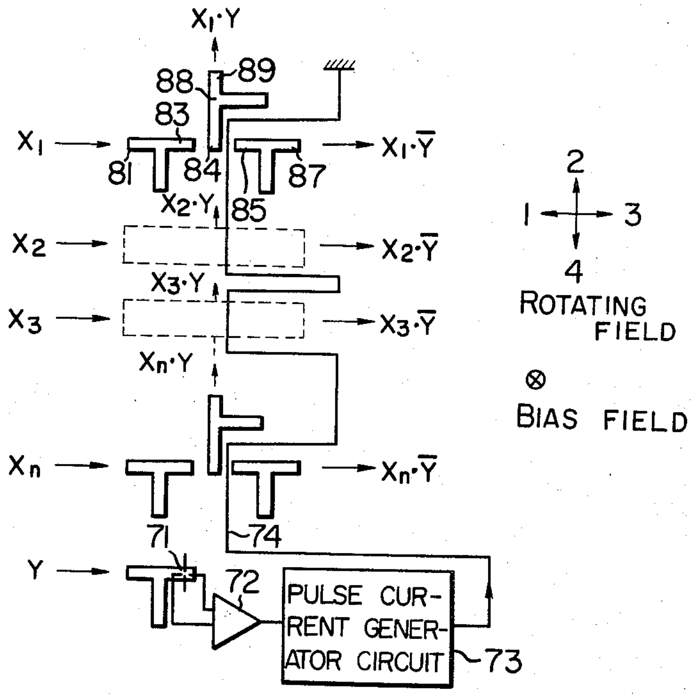
FIG. 7 is an arrangement diagram of a simultaneous logical product circuit at 1 : *n* according to the present invention.
Figure 8:
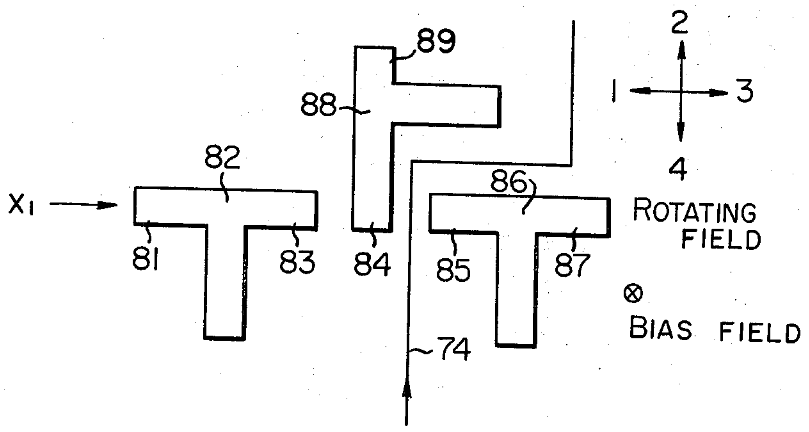
FIG. 8 is a partial arrangement diagram of the circuit in FIG. 7 for explaining the function and principle of the embodiment.

FIG. 7 is a diagram showing an example of arrangement of an AND circuit at 1 to *n* for executing the respective logical products between an input Y and inputs $X_1$, $X_2$ . . . . $X_n$. FIG. 8 is a diagram necessary for explaining the details of the embodiment. In FIG. 7, a magnetic bubble detector 71, an amplifier 72, a pulse current generator circuit 73 and a current loop 74 constitute a Y input circuit. Along the current loop 74 of the Y input circuit, magnetic domain AND circuits of the inputs $X_1$, $X_2$ . . . $X_n$ are arrayed which conduct the logical product operations with the input Y, respectively. For example, the circuit of the logical product between the input $X_1$ and the input Y is made up of the current loop 74 and magnetic poles 81, 83, 84, 88, 89. In case of this example, transition of the bubble by the Y input circuit is not conducted.

The operation of the Y input circuit is the same as in the case illustrated in FIGS. 5 and 6. If the Y input is "1" when the applied rotating field falls in the direction 3 as shown, a bubble is inputted, and is detected in the form of an electric signal by the detector 71. The pulse current generator circuit 73 is driven by the electric signal, and causes a pulse current to flow to the current loop 74 when the rotating field is brought into the direction 4. If, conversely, the Y input is "0", the application of the pulse current is inhibited. The pulse current of the current loop 74 acts in the respective AND circuits so as to weaken a bias field in the vicinity of the current loop on the input X side, and to strengthen the bias field in the vicinity of the current loop on the other side. For example, if, in FIG. 7, the pulse current in the direction of an arrow flows through the current loop 74 when the bias field is applied in a manner to be directed into the drawing, the bias field close to the magnetic pole 84 in the circuit of the logical product between the input $X_1$ and the input Y is enfeebled, while that close to a magnetic pole 85 is intensified.

In order to explain the principle of the logical product operation of the circuit arrangement in FIG. 7, only the AND circuit for the input $X_1$ and the input Y is specifically illustrated in FIG. 8 on a larger scale. When the input $X_1$ is "1", a bubble is inputted. The input bubble reaches the magnetic pole 84 by the rotation of the rotating field in the order of 1 → 2 → 3 → 4. If the input Y is "0" at this time, no current flows through the current loop 74, and hence, the bubble of the input $X_1$ is moved from the magnetic pole 84 through magnetic poles 85 and 86 to a magnetic pole 87 and is outputted from the last-mentioned magnetic pole in accordance with the rotating field. Thus, an output representative of $X_1 \cdot \bar{Y}$ is transmitted from the magnetic pole 87. If the input Y is "1", the pulse current flows through the current loop 74. As a result, the bias field in the region between the magnetic pole 85 and the current loop 74 is strengthened, to form a magnetic barrier therein. For this reason, when the rotating field is rotated from the direction 4 to the direction 1, the bubble of the input $X_1$ cannot move from the magnetic pole 84 to the magnetic pole 85, and is directed to the magnetic pole 88. When the rotating field is rotated to the direction 2, it is outputted from the magnetic pole 89. Thus, an output representative of $X_1 \cdot Y$ is transmitted from the magnetic pole 89. The operation stated above applies to the other magnetic domain AND circuits which are arrayed along the current loop 74.

EMBODIMENT II

Figure 9:
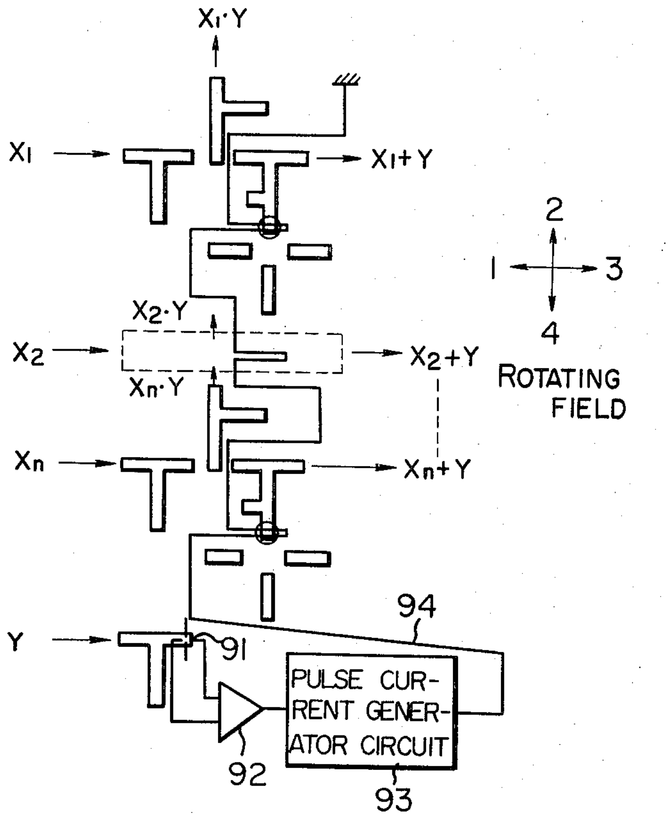
FIG. 9 is an arrangement diagram of a simultaneous logical product and logical sum circuit at 1 : *n* according to the present invention.
Figure 10:
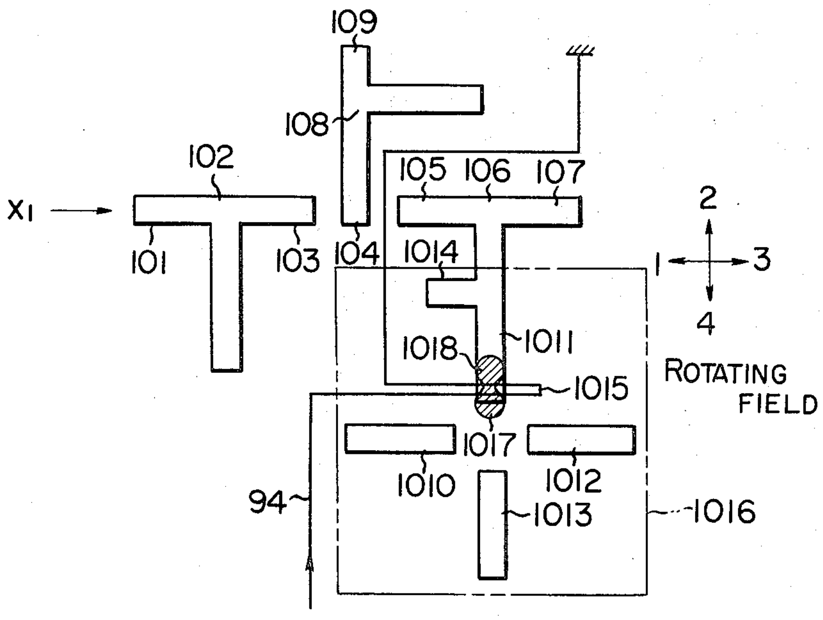
FIG. 10 is a diagram for explaining in detail the function and principle of the embodiment in FIG. 9.

FIG. 9 is a diagram showing an example of arrangement for executing the respective logical product operations and logical sum operations between an input Y and inputs $X_1, X_2 \ldots X_n$. FIG. 10 is an enlarged diagram of a part of the embodiment in FIG. 9.

In the circuit arrangement in FIG. 9, the control of the current loop depending on the presence or absence of the input Y is the same as in the case of FIG. 7. That is to say, when the input Y is "1", a bubble of the input Y is detected by a detector 91 in the course in which the direction of the rotating field lies between those 4 and 1. The input drives a pulse current generator circuit 93, and thus causes the pulse current to flow through a current loop 94. On the other hand, if the input Y is "0", the pulse current is inhibited. FIG. 10 specifically illustrates on an enlarged scale only that circuit in FIG. 9 which conducts the logical product and the logical sum with the input $X_1$ and the input Y. Referring to FIG. 10, numerals 101 to 1014 designate various magnetic poles composing the logical circuit, 1015 a hairpin loop in the current loop 94, 1016 an idler circuit, and 1017 and 1018 magnetic bubbles.

Now, consider a case where the input $X_1$ is in the state "1" and where a bubble is accordingly inputted. If the input Y is "0" at this time, a bubble in the idler circuit 1016 is subject to no change, because no current flows through the current loop 94. Therefore, the input bubble of $X_1$ is shifted along the magnetic poles 101 → 102 → 103 → 104 → 105 → 106 → 107, and is outputted from the magnetic poles 107. In case of the input Y being "1", when the direction of the rotating field is brought into the direction 4 and the input bubble of $X_1$ is moved onto the magnetic pole 104, the current flows through the current loop 94 including the hairpin loop 1015. For this reason, the bubble on the magnetic field 104 cannot move to the magnetic pole 105. As the rotating field is rotated in the directions 4 → 1 → 2, the bubble is moved along the magnetic poles 104 → 108 → 109 and is outputted from the magnetic pole 109. On the other hand, the bubble in the idler circuit 1016 comes onto the magnetic pole 1011 and is divided into the bubbles 1017 and 1018, when the current flows through the hairpin loop 1015. One of the divided bubbles 1017 is rotated within the idler circuit 1016 as the direction of the rotating field is successively rotated along 4 → 1 → 2. The other divided bubble 1018 is outputted through the magnetic poles 1014 → 106 → 107.

In the opposite case where the input $X_1$ is "0" and where no bubble is therefore inputted, if the input Y is "0", the bubble merely continues to rotate within the idler circuit 1016, and no bubble is outputted from the magnetic poles 107 and 109. When, in contrast, the input Y is "1", the current flows through the hairpin loop 1015 while the rotating field is in the direction of 4 → 1. The bubble arriving at the magnetic pole 1011 is accordingly divided. Thereafter, one of the divided bubbles is outputted from the magnetic pole 107 in conformity with the direction of the rotating field.

It is understood from the above description that the logical sum between the input $X_1$ and the input Y is derived at the magnetic pole 107, while the logical product between $X_1$ and Y at the magnetic pole 109. The foregoing operation is similarly conducted for the respective logical circuits, shown in FIG. 9, which are arrayed along the current loop 94.

EMBODIMENT III

Figure 11:
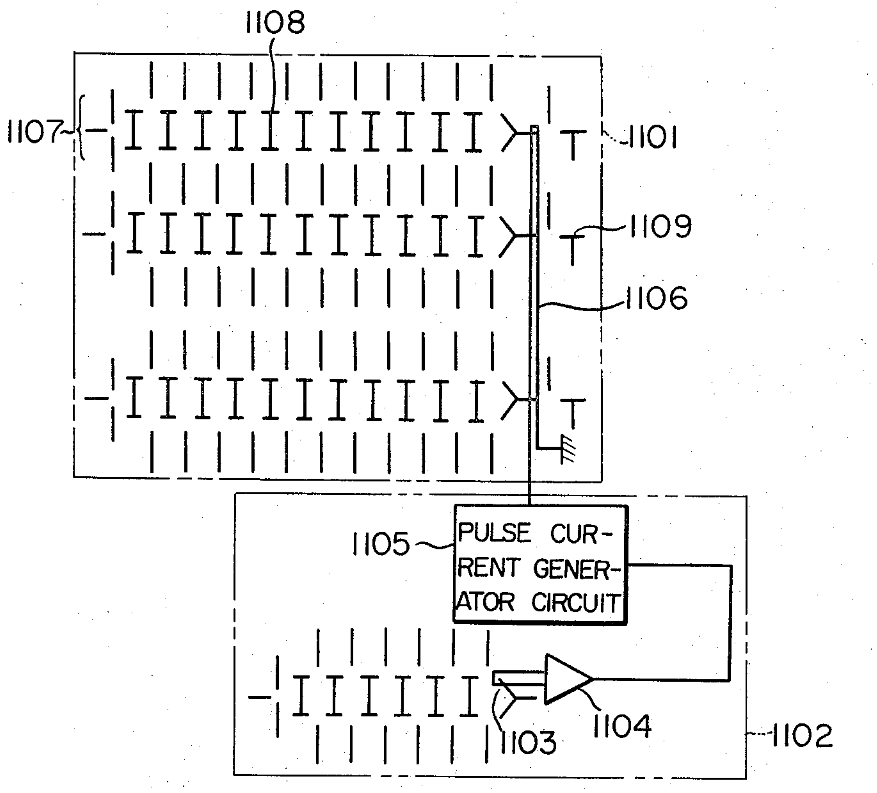
FIG. 11 is a diagram showing a further embodiment of the present invention.

FIG. 11 shows an embodiment in which the present invention is applied to a memory for pattern recognition (pattern match memory) or an associative memory. Reference numeral 1101 designates a memory array, 1102 a shift register for putting a pattern for retrieval or for check thereinto, 1103 a bubble detector circuit, 1104 an amplifier, 1105 a current pulse generator circuit, 1106 a hairpin loop for dividing a bubble, 1107 a memory loop composing the memory array 1101, 1108 a permalloy pattern, and 1109 a pattern match output end.

Figure 12:
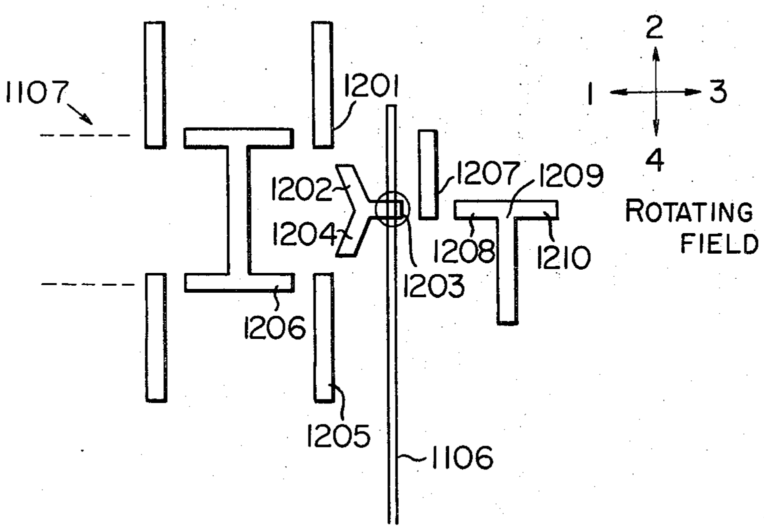
FIG. 12 is a diagram for explaining in detail the embodiment illustrated in FIG. 11.

FIG. 12 is a diagram showing on an enlarged scale a part of a logical circuit in FIG. 11 for performing In the pattern match memory, when the output of the check register 1102 is "1", a pulse current is applied to the hairpin loop 1106. The timing is made coincident with the period of time in which the direction of the rotating field is changed from the direction 3 to the direction 4. A bubble on the memory loop 1107 is moved along magnetic poles 1201 → 1202 → 1203 → 1204 → 1205 → 1206 in FIG. 12 with the rotation of the rotating field. If the bubble is present on the magnetic pole 1203 at initiation of the application of the pulse current to the hairpin loop 1106, it is divided into two bubbles. One of the divided bubbles is held within the memory loop 1107, and it is shifted to the magnetic pole 1204 when the rotating field is rotated from the direction 3 to the direction 4. The other divided bubble is moved along magnetic poles 1203 → 1207 → 1208 → 1209 → 1210 with the rotation of the rotating field. Thus, the logical product between 1 bit in the check register 1102 and 1 bit in the memory loop corresponding thereto is outputted at the mgnetic pole 1210. The embodiment is an example of memory for pattern recognition as utilizes the present invention effectively.

We claim:

1. A magnetic domain circuit arrangement comprising:

1. an electric conductor connected between at least one first desired group of magnetic material patterns and at least one second desired group of magnetic material patterns, the second pattern group being present at a position distant from the first pattern group, 2. magnetic bubble-detecting means provided in said first group of magnetic material patterns, 3. current supply means connected between said magnetic bubble-detecting means and said electric conductor for supplying current to said electric conductor in response to a detection output of said detecting means, and 4. magnetic bubble-generating means provided in said second group of magnetic material patterns for generating a magnetic bubble in response to the current supplied by said current supply means.

2. A magnetic domain circuit arrangement according to claim 1, wherein said magnetic bubble-generating circuit comprises an idler circuit constructed so that a magnetic bubble may circulate along a predetermined path in accordance with rotation of a rotating field, and a hairpin conductor loop provided at a predetermined position in said path of said idler circuit and connected to said electric conductor.

3. A magnetic domain circuit arrangement according to claim 1, wherein said current supply means comprises a pulse current-generating circuit which supplies a pulse current in response to said detection output from said magnetic bubble-detecting means, said pulse current having a peak value not smaller than a predetermined threshold value.

4. A magnetic domain circuit arrangement according to claim 1, wherein at least one first group of magnetic material patterns consists of a single predetermined group of magnetic material patterns, said at least one second group of magnetic material patterns consists of *n* groups of magnetic material patterns, said *n* groups having the same configuration, and the respective pattern groups are connected in series by said electric conductor.

5. A magnetic domain circuit arrangement comprising:

an electric connector connected between at least one first desired group of magnetic material patterns and at least one second desired group of magnetic material patterns, the second pattern group being present at a position distant from the first pattern group, magnetic bubble-detecting means provided in said first pattern group, current supply means connected between said magnetic bubble-detecting means and said electric conductor for supplying current to said electric conductor in response to a detection output of said magnetic bubble-detecting means, and at least one magnetic bubble-input means provided in said second pattern group for providing at least one magnetic bubble in said second pattern group, said at least one magnetic bubble being transmitted in a first direction within said second pattern group upon the presence of current in said electric conductor and said at least one magnetic bubble being transmitted in a second direction within said second pattern group upon the absence of current in said electric conductor.

6. A magnetic domain circuit arrangement according to claim 5, wherein said current supply means comprises a pulse current-generating circuit which supplies a pulse current in response to said detection output from said magnetic bubble-detecting means, said pulse current having a peak value not smaller than a predetermined threshold value.

7. A magnetic domain circuit arrangement according to claim 5, wherein said at least one first group of magnetic material patterns consists of a single predetermined group of magnetic material patterns, said at least one second group of magnetic material patterns consists of *n* groups of magnetic material patterns, said *n* groups having the same configuration, and the respective pattern groups are connected in series by said electric conductor.

8. A magnetic domain circuit arrangement according to claim 5, wherein said at least one magnetic bubble is transmitted in said first and second directions in accordance with rotation of a rotating field.

9. A magnetic domain circuit arrangement according to claim 5, further comprising magnetic bubble-generating means provided in said second pattern group for generating at least a second magnetic bubble in response to the current supplied by said current supply means wherein said at least one magnetic bubble is transmitted in said first direction and said at least a second magnetic bubble is transmitted in said second direction.

10. A magnetic domain circuit arrangement according to claim 9, wherein said magnetic bubble-generating means includes an idler circuit constructed so that a magnetic bubble may circulate along a predetermined path in accordance with rotation of a rotating field, and a hairpin conductor loop provided at a predetermined position in said path of said idler circuit and connected to said electric conductor.

* * * * *